Patented Dec. 8, 1931

1,835,105

UNITED STATES PATENT OFFICE

HARRY M. WEBER, OF MONTCLAIR, NEW JERSEY, ASSIGNOR TO ELLIS-FOSTER COMPANY, OF MONTCLAIR, NEW JERSEY, A CORPORATION OF NEW JERSEY

NITROCELLULOSE COATING COMPOSITION

No Drawing.   Application filed April 4, 1925. Serial No. 20,847.

This invention is concerned with the art of rendering petroleum available for wider use in the industries and relates in a general way to methods of obtaining oxygenated derivatives of petroleum and to their evaluation or conversion into valuable fabricated products.

Specifically the invention relates to compositions containing cellulose esters or ethers, particularly nitrocellulose, soluble cotton and so forth; such oxygenated petroleum derivatives especially in esterified form, e. g. acetylated, yielding varnishes, lacquers, paints, lacquer enamels and the like.

As a raw material I use petroleum and the fractions thereof including heavy oils, gas oil and the like also shale oil, so-called mineral oil hydrocarbons, and in general comprise under the term petroleum the various naturally occurring hydrocarbons and the fractions or cracked products obtained from them by distillation or heat treatment.

According to the present invention the oxygenated petroleum derivatives preferably in part at least of a water-soluble character may be prepared by blowing air through a body of petroleum oil, e. g. gas oil at an elevated temperature and at a pressure substantially above atmospheric thereby cracking and oxidizing the petroleum oil. Cracked hydrocarbons and partially oxidized products are thus obtained. For example air may be blown into gas oil at a temperature of 750° F. under a pressure of 20 atmospheres per square inch. The vapors and gases passing off are subjected to condensation and two layers are obtained, the lower of which is aqueous and contains aldehydes and various water-soluble substances including acetone and alcohols. The other layer contains the hydrocarbons together with substances not soluble in water, including certain higher aldehydes and other oil-soluble products of the oxidation.

The water-insoluble or oily layer may be distilled and fractions refined which may be used in the composition of the present invention. I prefer particularly to employ those lighter boiling fractions which contain aromatic hydrocarbons of the benzol type together with some of the water-insoluble oxidized bodies.

The aqueous layer may be given a preliminary distillation to remove and collect aldehydes. Organic acids such as acetic acid may be neutralized with soda ash or lime and the salts thus obtained may be collected at a later stage and used for esterification purposes hereunder. The aqueous material is treated in an efficient column still to obtain nitrocellulose solvents or bodies which on subequent treatment become nitrocellulose solvents. A minor portion of the watery distillate, that boiling between about 50 and 67° C. will be found capable of dissolving nitrocellulose. Of itself however it is not suitable in the preparation of lacquers and lacquer enamels unless mixed with a high boiling solvent such as butyl or amyl acetate, the latter serving as a water eliminant to prevent blushing of the coating during drying. The higher boiling fractions are potential rather than true cellulose ester solvents but may be converted into the latter on esterification. For this purpose as indicated the organic acids obtained in the oxidation process may be used, either as their salts, as the free acids, or glacial acetic acid or other acids from non-petroleum sources may be employed.

As an example 90 parts by weight of the rectified aqueous distillate boiling between 77 and 86° C. were mixed with 120 parts of glacial acetic acid and the mixture run slowly into 50 parts of concentrated sulphuric acid. The temperature of the latter was maintained at a point where the compound formed distilled off at approximately the same rate as that of the entering charge. The product thus obtained consisted of a mixture of water-soluble and water-insoluble bodies. After washing with a 10 per cent solution of sodium carbonate the water-insoluble portion was separated from the alkaline solution and was distilled. A product boiling between 66 and 85° C. was obtained which was found to be a true solvent for nitrocellulose. The alkaline solution upon distillation yielded a smaller quantity of a distillate boiling between 77 and 95° C. which was not a true nitrocellulose solvent but which however may be used in conjunction with such true solvents.

A lacquer was prepared from the esterfied oxygenated petroleum derivative boiling between 66 and 85° C. by dissolving 10 parts of soluble cotton in 50 parts thereof and adding thereto a solution consisting of 50 parts of benzol in which was dissolved 10 parts of rosin phthalic glyceride resin. The resulting clear lacquer when applied to a surface dried quickly to form a clear transparent film, without any indications of blushing. It may be noted that blushing could be induced by breathing on the film while it was drying, but the blush thus induced subsequently disappeared when the film was allowed to become thoroughly dry at room temperature. Thus it is evident that the acetylated oxygenated petroleum derivative functions as a water-eliminant in lacquer coatings. In this respect I have observed under the conditions stated that the acetylated material behaves quite differently from other well known low boiling acetylated solvents obtained from alcohols, as for example ethyl acetate. For purposes of comparison I prepared a solution employing ethyl acetate in place of the acetylated oxygenated petroleum derivative material and found the film to blush badly, the blushing being permanent when the coating was drying at room temperature under the particular conditions of the test and disappearing only when a temperature of 50° C. was employed in the final drying; the tests in both cases being under comparable conditions.

In the nitrocellulose field therefore the water-soluble portions of the oxygenated petroleum derivatives after suitable esterification have great value in the nitrocellulose industry not only because of their effectiveness as a part of the vehicle in lacquers and the like but because of the relative cheapness of manufacture.

The cellulose bodies employed may be cellulose acetate or cellulose ethers but as previously indicated the preferred embodiment of the invention relates to nitrocellulose in its various forms such as soluble cotton of high or low viscosity (so-called low viscosity cotton), gun cotton, celluloid, including celluloid scrap and used moving picture film etc. In lacquers and lacquer enamels it is customary to add a certain amount of a resin to give greater substance to the coating and oftentimes to improve the adhesion. I may employ a natural resin such as shellac, dammar, sandarac and the like or synthetic resins such as the various glyceride resins using rosin phthalic glyceride, benzoic phthalic glyceride, salicylic phthalic glyceride and other glyceride resins made with one or more organic acids. These are particularly desirable as they are unusually effective with nitrocellulose owing to their high degree of compatability. Other resins including rosin esters or ester gums, esterified copals, phenol formaldehyde resins and the like may be used in some cases. A gum or resin which is obtained from the petroleum oxidation aqueous distillates on treatment with alkali may be hardened and employed in the present composition in place of the foregoing resins or in conjunction therewith. In its softer forms it may be employed as a softening agent to give greater flexibility. Various softening agents such as diethylphthalate, triphenyl or tricresyl phosphate, castor oil and the like also may be employed as softening agents.

The invention is not limited to the use exclusively of solvents obtained by the oxidation of petroleum. I may employ the latter in conjunction with any of the solvents heretofore employed in the nitrocellulose industry including the various esters of acetic acid, diethyl carbonate, ethyl lactate, furfural and so forth. Also hydrocarbons such as benzol, toluol, xylol and solvent naphtha. The lighter hydrocarbons of the water-insoluble layer obtained in the oxidation step may as indicated be employed as additions with or without benzol, toluol and the like to serve as resin solvents and as diluents to lower the cost of the composition.

Various pigments and coloring agents may be incorporated with the lacquer solution, for example in the case of pigments by grinding in a ball mill so as to obtain a smooth lacquer enamel composition which may be readily applied by spraying or brushing as the case may be.

By the term "oxygenated petroleum derivatives" as used herein, it is intended to cover the partial oxidation products of petroleum or related hydrocarbons, which partial oxidation products are complex mixtures of compounds containing oxygen bound up in the molecules of such compounds, and are obtained by subjecting mixtures containing aliphatic hydrocarbons, such as petroleum fractions, to oxygen or an oxygen-containing gas under conditions which will introduce oxygen and chemically combine it with the aliphatic hydrocarbons of the mixture treated.

What I claim is:—

1. A coating composition comprising nitrocellulose in a vehicle comprising water-soluble oxygenated petroleum derivatives.

2. A coating composition comprising nitrocellulose in a vehicle comprising the acetic esters of petroleum oxidation products.

3. A coating composition comprising a cellulose compound in acetylated oxygenated petroleum derivatives.

4. A coating composition containing nitrocellulose, a petroleum resin, a petroleum hydrocarbon and water-soluble oxygenated petroleum derivatives.

5. A coating composition containing nitrocellulose and a distillate obtained from the volatile, water soluble, petroleum oxygenation products, together with a water eliminant.

6. A coating composition containing nitrocellulose, an acetylated distillate obtained from the volatile, water soluble, petroleum oxygenation products, said distillate boiling between 66 and 85° C., and an acetylated distillate obtained from the volatile, water soluble, petroleum oxygenation products and boiling between 77 and 95° C.

7. A nitrocellulose and the like lacquer vehicle comprising oxygenated petroleum derivatives.

8. A coating composition comprising nitrocellulose and oxygenated petroleum derivatives.

9. A coating composition comprising nitrocellulose and oxygenated petroleum derivatives including esters.

10. A nitrocellulose and the like lacquer vehicle containing oxygenated petroleum derivatives including esters.

HARRY M. WEBER.